United States Patent [19]

Tomic et al.

[11] Patent Number: 5,273,595
[45] Date of Patent: Dec. 28, 1993

[54] APPARATUS USING REMOVABLE PROFILE WEDGES FOR MANUFACTURE OF RECLOSABLE BAG

[75] Inventors: Mladomir Tomic; David DiPietro, both of Appleton, Wis.

[73] Assignee: Reynolds Consumer Products, Inc., Appleton, Wis.

[21] Appl. No.: 986,836

[22] Filed: Dec. 9, 1992

[51] Int. Cl.$^5$ .................................. B29C 47/06
[52] U.S. Cl. .......................... 156/66; 156/91; 156/244.11; 156/244.15; 156/244.25; 156/500; 264/167; 264/171; 264/176.1; 425/131.1; 425/133.5; 425/461; 425/464; 425/465; 425/466; 425/467
[58] Field of Search ............ 156/66, 91, 244.11, 156/244.15, 244.25, 500; 264/167, 171, 176.1, 177.1; 425/131.1, 133.5, 461, 464, 465, 466, 467

[56] References Cited

U.S. PATENT DOCUMENTS

| | | | |
|---|---|---|---|
| 3,462,332 | 8/1969 | Goto | 156/244.24 |
| 4,259,133 | 3/1981 | Yagi | 156/91 |
| 4,293,517 | 10/1981 | Knox | 425/461 X |
| 4,300,878 | 11/1981 | Ible | 425/133.5 X |
| 4,392,897 | 7/1983 | Herrington | 425/104 X |
| 4,411,614 | 10/1983 | Feathers | 425/461 X |
| 4,416,604 | 11/1983 | Bender et al. | 425/185 X |
| 4,435,141 | 3/1984 | Weisner et al. | 425/133.5 X |
| 4,515,647 | 5/1985 | Behr | 425/133.5 X |
| 4,525,131 | 6/1985 | Hauser, Jr. | 425/114 |
| 4,540,537 | 9/1985 | Kamp | 156/66 |
| 4,653,994 | 3/1987 | Capelle | 425/131.1 |
| 4,795,125 | 1/1989 | Baros et al. | 425/195 X |
| 5,046,938 | 9/1991 | Hirschberger | 425/141 X |
| 5,053,091 | 10/1991 | Giljam et al. | 156/66 |
| 5,057,267 | 10/1991 | Seizert et al. | 425/465 X |
| 5,073,102 | 12/1991 | Guggiari | 425/461 |
| 5,108,683 | 4/1992 | Anand | 425/133.1 X |

*Primary Examiner*—Caleb Weston
*Attorney, Agent, or Firm*—Alan T. McDonald

[57] ABSTRACT

The present invention relates to the integral extrusion of closure profiles and a film through a film die. The present invention provides an apparatus for integrally extruding a film and closure profiles from a single stream of molten material and, consequently, eliminating any joining problems between the film and the closure profiles. The present invention utilizes a removable die lip with removable profile wedges that mount in the die lip and extrude the closure profiles and a film together from a single stream of molten material. In this manner, the closure profiles and the film are integrally formed, and if a new closure profile design is desired, the present invention permits the quick and economical replacement of a removable profile wedge with another.

17 Claims, 3 Drawing Sheets

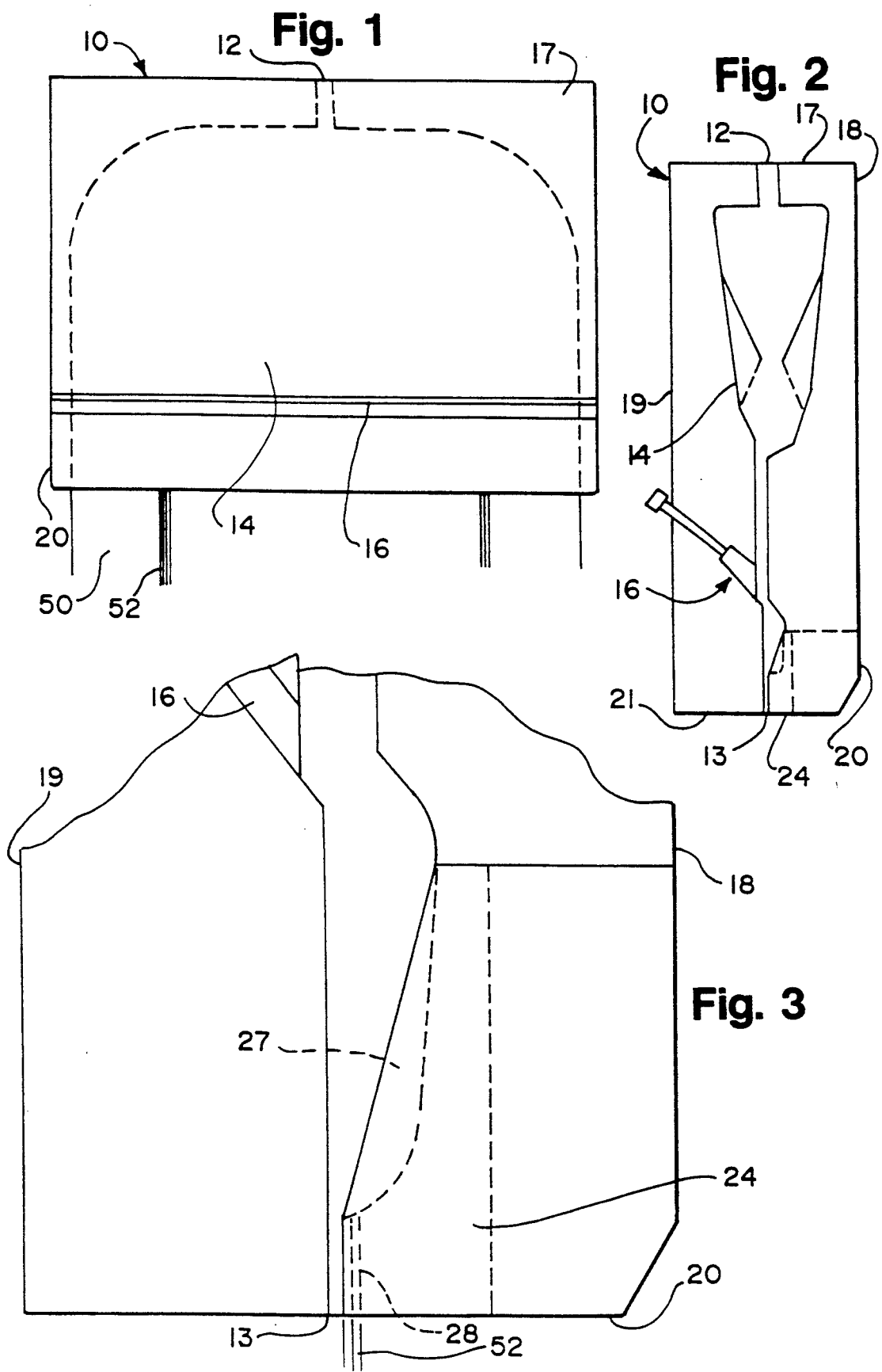

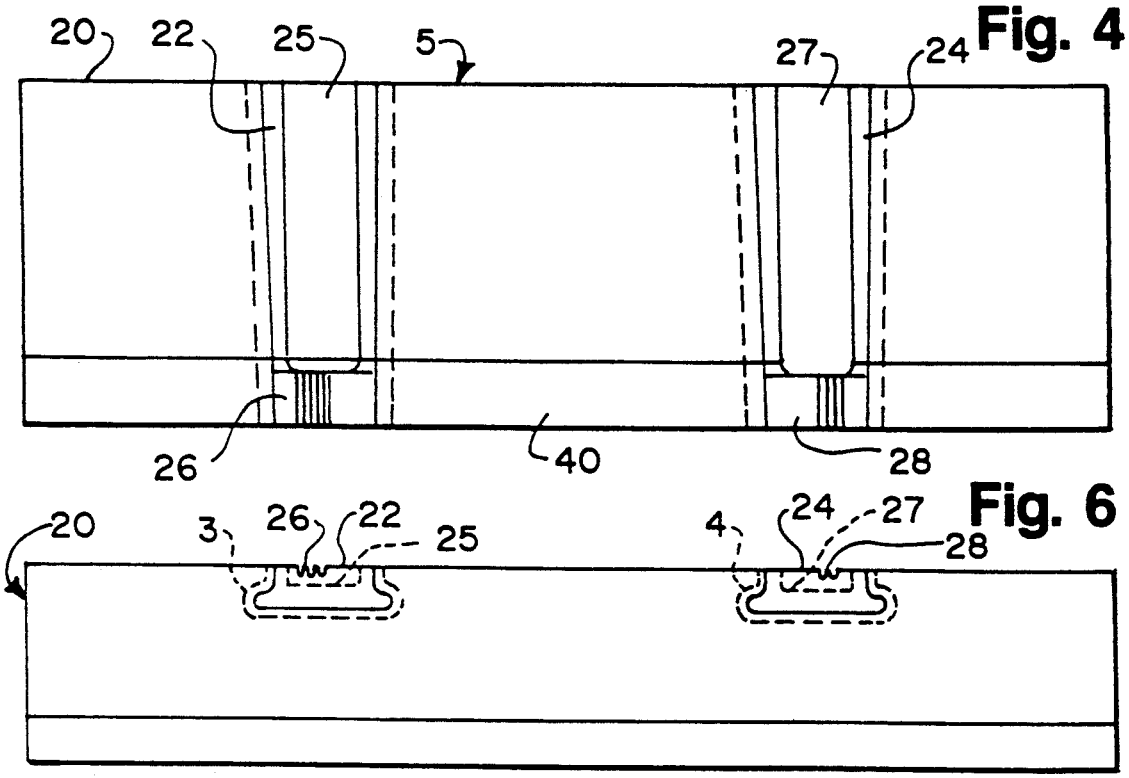
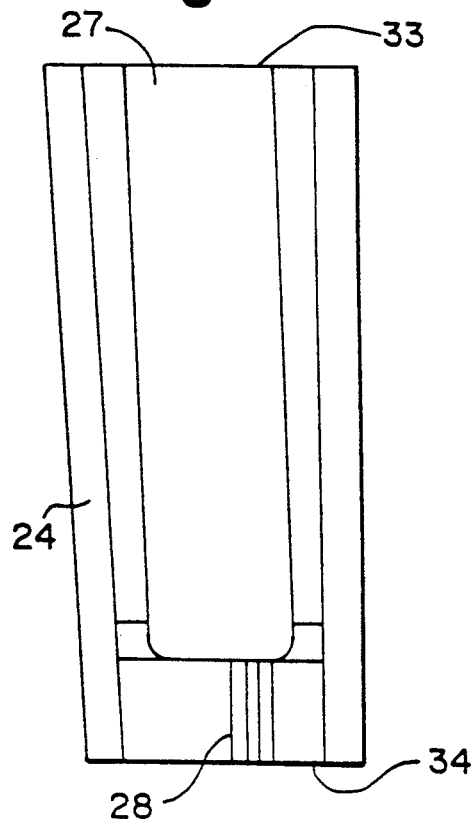
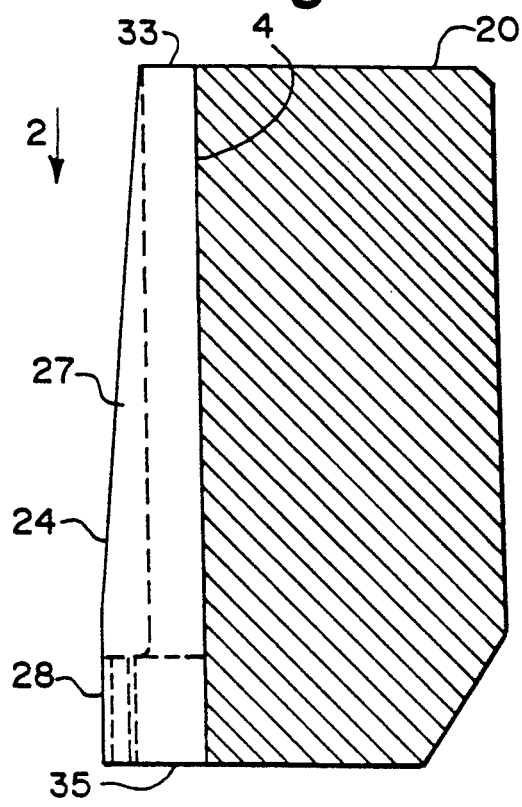

APPARATUS USING REMOVABLE PROFILE WEDGES FOR MANUFACTURE OF RECLOSABLE BAG

FIELD OF THE INVENTION

The present invention generally relates to an apparatus that extrudes a film having closure profiles from a molten material. More particularly, this invention relates to an apparatus that uses removable profile wedges to extrude a plastic film having closure profiles from a molten material stream.

BACKGROUND OF THE INVENTION

The extrusion of a film from a molten material is the first step and sometimes the only significant step in producing a variety of common products. One such product is a reclosable plastic bag. The reclosable plastic bag takes many forms and sizes, including sandwich bags to freezer bags. Manufacturers may produce reclosable bags by separately extruding the bag film and the reclosable profile strips and later attaching them. Another method creates the reclosable bags by extruding the bag film together with the closure profiles.

The extrusion of a film from molten material involves a film die. Generally, a film die has a top and bottom half. The molten material enters the die through an input opening at one end of the die and flows between the two halves of the die. A "coat hanger" type die is a typical film die. In a "coat hanger" die, a coat hanger shaped cavity or plenum is machined into the two halves of the die. The top of the coat hanger is at the input opening of the die, and the molten plastic resin spreads out into the die. In this way, the die spreads the molten material as it flows through the die toward die lips which form an output opening at an end of the die opposite the one end of the die with the input opening. The molten material exits the die at the die lips as a layer of film.

The film exits the die lips and may subsequently join with closure profiles that are extruded separately from the film. If the joining occurs after the closure profiles and the film exit the die, however, the closure profiles and the film may not properly join reliably. A better method is to join the closure profiles and the film within the die, but joining problems between the closure profiles and the film may still occur.

The existing methods that join the closure profiles and the film within the die require a die with separate channels to transport molten material directly to where the closure profiles are extruded. These methods are shown in U.S. Pat. Nos. 4,515,647 and 5,073,102 and are incorporated here by reference. One method accomplishes this with a separate channel that taps into the main flow of molten material and diverts a portion of that flow directly to the closure profile extrusion sites. A second method requires an entirely different source of molten material that feeds into separate channels of the die and transports the molten material directly to the closure profile extrusion sites. This method attempts to compensate for any joining difficulties between the closure profiles and the film by using closure profiles with expanded bases.

These extrusion methods require strict control of the molten material flow through the separate supply channels to the closure profile extrusion sites. The molten material flow through the separate supply channels must match the molten material flow for the formation of the bag film. If both flow rates are not properly coordinated and the closure profiles are extruded too slowly or too quickly with respect to the bag film, the extrusion of the closure profiles may adversely affect bag film formation.

The above methods attempt to solve joining problems between the closure profiles and the bag film by joining the closure profiles and the bag film within the die. Other problems, however, arise from the use of separate channels for extruding closure profiles and the bag film. For example, additional manufacturing is required to make the separate channels. As mentioned above, the molten material flow in the separate channels and the molten material flow for bag film formation must be coordinated. In addition, these methods may still experience joining problems between the closure profiles and the bag film.

Existing extrusion devices are commonly unable to conveniently change closure profile design. Today, an apparatus that extrudes closure profiles and bag film should be flexible enough to handle a variety of closure profile designs and bag films. Manufacturers of reclosable bags must extrude different closure profile designs for different varieties of reclosable bags. Reclosable bag manufacturers are also involved with the testing of new closure profile designs. If a manufacturer is involved in testing new closure profile designs or needs another closure profile design for a different variety of reclosable bag, the ability to easily switch closure profile designs in an extrusion apparatus saves time and money.

SUMMARY OF THE INVENTION

The present invention relates to the integral extrusion of closure profiles and a film through a film die. The present invention provides an apparatus for integrally extruding a film and closure profiles from a single stream of molten material and, consequently, eliminates any joining problems between the film and the closure profiles. The present invention utilizes a removable die lip with removable profile wedges that mount in the die lip and extrude the closure profiles and a film together from a single stream of molten material. In this manner, the closure profiles and the film are integrally formed, and if a new closure profile design is desired, the present invention permits the quick and economical replacement of a removable profile wedge with another.

In a preferred embodiment, the present invention forms part of an apparatus for integrally extruding a film together with closure profiles. A stream of molten material enters a die from an opening in the die. The die is formed by two halves and a "coat hanger" shaped cavity or plenum within the two halves of the die. The plenum spreads the molten material within the die. A choker bar is mounted within the die plenum that further redistributes or channels the molten material and allows more molten material to flow in desired areas. The molten material flows through the plenum toward an opening between the two halves of the die. An opening between the two halves of the die for the stream of molten material to exit the die is defined by a pair of die lips.

The present invention encompasses a removable die lip on one half of the die. The removable die lip has first and second profile slots that face toward the other half of the die. A first removable profile wedge fits inside the first profile slot and taper locks to the removable die lip, and a second removable profile wedge fits inside the second profile slot and taper locks to the removable die lip, leaving a side of each removable profile wedge exposed to the molten material stream. On the exposed side, the first and second removable profile wedges each has a profile channel and a molten material trough that interact with the molten material stream. The molten material stream passes between the die lips of both halves of the die. As the molten material stream passes through the die lips, the stream also passes through the removable profile wedges of the removable die lip. The molten material volume increases within the molten material trough, and the closure profiles are integrally extruded together with the film as the molten material stream passes through the profile channels of the removable profile wedges. Joining problems do not exist because the closure profiles and the bag film are integrally extruded.

The removable die lip and the removable profile wedges allow quick, convenient and economical change of the closure profile designs. If a reclosable bag manufacturer desires a different variety of closure profile, the manufacturer can remove the removable die lip, slide out the removable profile wedges from the profile slots and slide the removable profile wedges with the desired closure profile design into the profile slots. The manufacturer then mounts the removable die lip back onto the die and can proceed with extruding a film together with the new closure profile design.

BRIEF DESCRIPTION OF THE DRAWINGS

The advantages of the present invention will become apparent upon reading the following detailed description and upon reference to the accompanying drawings, in which:

FIG. 1 shows a plan view of an apparatus for integrally extruding a bag film together with closure profiles from a single stream of molten material;

FIG. 2 is a side view of the apparatus of FIG. 1;

FIG. 3 shows a removable die lip of the present invention mounted to a film die;

FIG. 4 shows a plan view of the removable die lip with removable closure profile wedges of the present invention;

FIG. 5 shows a plan view of the removable closure profile wedges of the present invention;

FIG. 6 shows an end view of the removable die lip of FIG. 4;

FIG. 7 is a cross-sectional representation of the removable die lip of FIG. 6.

DETAILED DESCRIPTION OF THE PREFERRED EMBODIMENT

Figure 8:
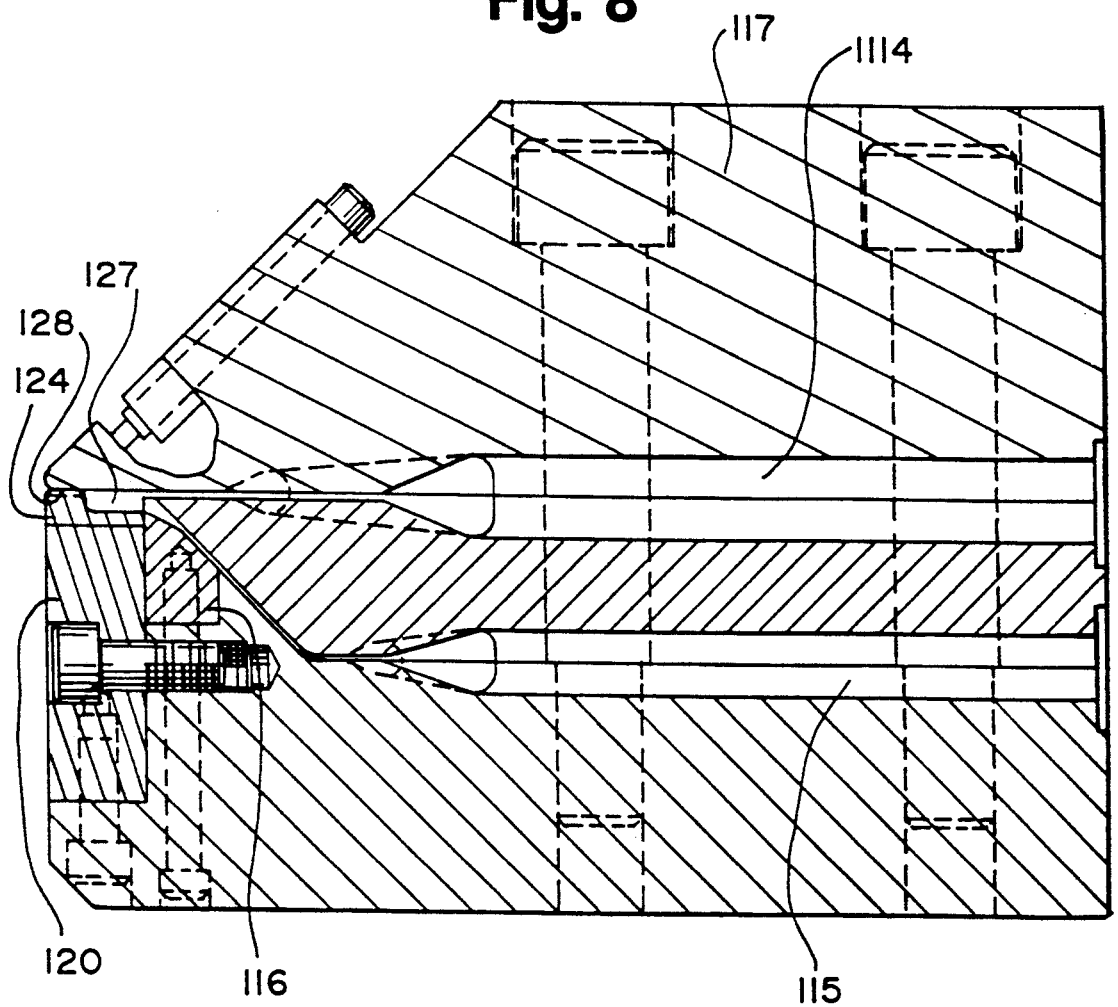
FIG. 8 is a cross-sectional representation of a dual manifold die for integrally extruding a bag film together with closure profiles using a removable die lip of the present invention.

Referring now to the drawings, and more particularly to FIG. 1, there is illustrated an apparatus, generally designated by the reference numeral 10, for integrally extruding a film together with closure profiles from a molten material stream. Molten material enters a cast film die 17 through a die opening 12 and flows into a coat hanger plenum 14. The coat hanger plenum 14 spreads the molten material as it flows through the die 17. In a preferred embodiment, a choker bar 16 mounted within the coat hanger plenum 14 further spreads the molten material, and the choker bar may be adjusted to allow more molten material to flow in desired areas by bending the choker bar or cutting notches into the bar. This spread stream of molten material will form the integrally extruded film 50 with closure profiles 52. The molten material stream continues through a removable die lip 20 where the molten material exits the die 17, forming a film integrally extruded with closure profiles.

As shown in FIG. 2, the die 10 is made from a first half 18 and a second half 19, and the removable die lip 20 is mounted to the die 17. As described above, the molten material stream enters the die 17 at the die opening 12. The molten material flows between the first and second halves 18, 19 and into the coat hanger plenum 14. In the coat hanger plenum 14, the molten material spreads. The choker bar 16 further spreads the molten material stream as the molten material stream approaches a die exit 13. The die exit 13 lies between the die lip 21 of the second half 19 and the removable die lip 20 of the first half 18. As the molten material exits the die 17 through the die exit 13, a film is integrally extruded together with closure profiles from the stream of molten material. As shown in FIG. 3, joining problems between the bag film and the closure profiles do not exist because the bag film 50 and the closure profiles 52 are never separated.

FIG. 4 shows a side of the removable die lip 20 that makes contact with the molten material stream and defines a border of die exit 13 of FIG. 2. The molten material flows through the removable die lip 20 in the direction shown by the arrow 5. The molten material stream flows through die lip 20 and a bag film is extruded along the length of removable die lip 20 on extrusion plane 40. The closure profiles and the film are extruded together at a first removable profile wedge 22 and a second removable profile wedge 24 located on extrusion plane 40. At the removable profile wedges 22, 24, the amount of molten material increases at a first molten material trough 25 and at a second molten material trough 27. The molten material troughs 25, 27 are reservoirs that collect molten material to prevent any shortages of molten material at those portions of the molten material stream where the closure profiles are extruded along with the film. The molten material stream flows into the first and second molten material troughs 25, 27 and enters into first and second profile channels 26, 28. At closure profile channels 26, 28, closure profiles are integrally extruded together with the film from the molten material stream.

The removable profile wedges 22, 24 are secured to the removable die lip 20 by taper locking. The removable profile wedge generally designated by reference numeral 24 is best seen in FIG. 5. A first end 33 of the removable profile wedge 24 is wider than a second end 34 and the sides of the removable profile wedge 24 taper inwardly from the first end 33 to the profile second end 34. As shown in FIG. 6, the first removable profile wedge 22 fits snugly into a first profile slot 3, and the second removable profile wedge 24 fits snugly into a second profile slot 4. The sides of the profile slots 3, 4 taper in the same manner as the sides of the removable profile wedges 22, 24. The taper lock of the removable profile wedges 22, 24 to the removable die lip 20 is provided by the tapered sides of the profile slots 3, 4 which hold the tapered removable profile wedges 22, 24 in place.

The present invention allows a manufacturer of reclosable bags to easily change closure profile designs. The ease of this changing is illustrated in FIG. 7 which shows a cross-sectional representation of the removable die lip of FIG. 6. The manufacturer first removes the removable die lip 20 from the die. The removable profile wedge 24 slides into the die lip 20 in the direction of the arrow 2 at the profile slot 4. The slot 4 surrounds the removable profile wedge 24 on three sides as best shown in FIG. 6. As described above, the removable profile wedge 24 taper locks with the sides of the profile slot 4, preventing the removable profile wedge 24 from sliding in the direction of arrow 2 and beyond exit edge 35 of the removable die lip 20. A manufacturer can easily change closure profile designs by sliding the removable profile wedge 24 in the opposite direction of arrow 2 and replacing the wedge 24 with a new removable profile wedge with the desired closure profile design by sliding the new removable profile wedge into profile slot 4 in the direction of arrow 2. In a preferred embodiment of the present invention, the removable profile wedge 24 is separated into two-pieces, the profile channel 28 and the molten material trough 27,, for more economy and ease in the changing of closure profile designs.

The present invention has been described as being used with a coat hanger type die. The present invention, however may be used with other types of film dies that will take advantage of the flexibility in using the removable die lip with removable profile wedges and the integral nature of the closure profiles and the film. For example, FIG. 8 illustrates a removable die lip 120 of the present invention used with a multiple plenum coat hanger die 117. Different layers of molten material are spread within multiple plenums 114, 115 and form a single stream of molten material before reaching the removable profile wedge 124. At the removable profile wedge 124, the film and the closure profiles are extruded together from a single stream of molten material that flows through the molten material trough 127 and the profile channel 128. A choker bar 116 is also shown to properly redistribute or channel the molten material.

Thus, the removable die lip with removable profile wedges and many of their attendant advantages will be understood from the foregoing description, and various modifications may be made in the form, construction and arrangement of the parts thereof without departing from the spirit and scope of the invention or sacrificing all of their material advantages, the form described above being merely a preferred or exemplary embodiment thereof.

We claim:

1. An apparatus for integrally extruding from a molten material stream a film having closure profiles comprising:

a die having a die cavity, a die entrance at a first end of said die and a die exit at a second end of said die, said die cavity is enclosed within said die and said molten material stream enters said die cavity through said die entrance and flows in said die towards said die exit;

a choker bar mounted within said die and positioned across said die cavity spreads said molten material;

a removable die lip mounted at said die exit and having a wedge slot, said wedge slot opens toward said molten material stream; and a removable profile wedge mounted in said wedge slot and including a first end and a second end, said removable profile wedge further including a molten material through and a profile channel, said molten material trough bordering said first end and said profile channel bordering on said second end and having the outline of a closure profile.

2. The apparatus of claim 1 wherein the removable profile wedge includes a profile channel and a molten material trough as two separate pieces.

3. The apparatus of claim 1 wherein the removable profile wedge is wider at said first end than at said second end.

4. The apparatus of claim 3 wherein the wedge slot has a first end and a second end and said first end is wider than said second end such that said removable profile wedge taper locks with said wedge slot.

5. The apparatus of claim 1 wherein said die is a coat hanger type die and includes a top half, and a bottom half, said removable die lip is mounted to said bottom half of said die at said die exit.

6. The apparatus of claim 1 wherein said removable die lip includes a first wedge slot and a second wedge slot and further including a first removable profile wedge mounted in said first wedge slot and a second removable profile wedge mounted in said second wedge slot.

7. A method for integrally extruding a film together with closure profiles from a molten stream comprising the steps of:

feeding said molten material stream into a die, said die comprising:

a die cavity, a die entrance at a first end of said die and a die exit at a second end of said die, said die cavity is enclosed within said die and said molten material stream enters said die cavity through said die entrance and flows in said die towards said die exit;

a choker bar mounted within said die and positioned across said die cavity spreads said molten material;

a removable die lip mounted at said die exit and having a wedge slot, said wedge slot opens toward said molten material stream; and a removable profile wedge mounted in said wedge slot and including a first end and a second end, said removable profile wedge further including a molten material trough and a profile channel, said molten material trough bordering said first end and said profile channel bordering on said second end and having the outline of a closure profile;

and extruding a film having closure profiles thereon within said die.

8. An apparatus for integrally extruding from a molten material stream a film having closure profiles comprising:

a die having a die cavity, a die entrance at a first end of said die, a die exit at a second end of said die and a choker bar, said die cavity is enclosed within said die, said molten material stream enters said die through said die entrance and flows in said die cavity towards said die exit and said choker bar is mounted within said die across said die cavity and spreads said molten material stream;

a removable die lip mounted to said die at said die exit and having an extrusion plane that defines a border of said die exit, a first wedge slot and a second wedge slot, said first and second wedge slots are positioned on said extrusion plane and open towards said molten material stream;

a first removable profile wedge mounted in said first wedge slot, said first removable profile wedge including a molten material trough and a profile channel, said profile channel having the outline of a closure profile; and a second removable profile wedge mounted in said second wedge slot, said second removable profile wedge including a molten material trough and a profile channel, said profile channel having the outline of a closure profile.

9. The apparatus of claim 8 wherein the first removable profile wedge includes a profile channel and a molten material trough as two separate pieces.

10. The apparatus of claim 8 wherein the first and second removable profile wedges are wider at said first end than at said second end.

11. The apparatus of claim 10 wherein the first and second wedge slots have a first end and a second end and said first end is wider than said second end such that said first removable profile wedge taper locks with said first wedge slot, and aid second removable profile wedge taper locks with said second wedge slot.

12. The apparatus of claim 8 wherein said die is a coat hanger type die.

13. An apparatus for integrally extruding from a molten material stream a film having closure profiles comprising:

a die having a top half, a bottom half, a die cavity between said top and bottom halves, a die entrance at a first end of said die, a die exit at a second end of said die and a choker bar mounted in said cavity adjacent to said die exit, said molten material stream enters said die through said die entrance and flows between the two halves of the die in the die cavity towards said die exit, said choker bar is mounted within said die and positioned across said die cavity and spreads said molten material stream; and a removable die lip mounted to said bottom half of said die at said die exit and having an extrusion plane, a first wedge slot and a second wedge slot, said first and second wedge slots are positioned on said extrusion plane and open towards said bottom half of the die and said molten material stream, said removable die lip includes:

a first removable profile wedge mounted in said first wedge slot, said first removable profile wedge including a molten material trough and a profile channel, said profile channel having the outline of a closure profile; and a second removable profile wedge mounted in said second wedge slot, said second removable profile wedge including a molten material trough and a profile channel, said profile channel having the outline of a closure profile.

14. The apparatus of claim 13 wherein the first removable profile wedge includes a profile channel and a molten material trough as two separate pieces.

15. The apparatus of claim 13 wherein the first and second removable profile wedges are wider at said first end than at said second end.

16. The apparatus of claim 13 wherein the first and second wedge slots have a first end and a second end and said first end is wider than said second end such that said first removable profile wedge taper locks with said first wedge slot, and said second removable profile wedge taper locks with said second wedge slot.

17. The apparatus of claim 13 wherein said die is a coat hanger type die.

* * * * *